United States Patent [19]
Millward

[11] Patent Number: 5,757,310
[45] Date of Patent: May 26, 1998

[54] TACTICAL BALLISTIC MISSLE EARLY WARNING RADAR AND DEFENCE SYSTEM

[75] Inventor: Gerald W. Millward, Bristol, Great Britain

[73] Assignee: Matra BAe Dynamics (UK) Ltd., Hertfordshire, United Kingdom

[21] Appl. No.: 635,701

[22] Filed: Apr. 22, 1996

[30] Foreign Application Priority Data

May 3, 1995 [GB] United Kingdom ............... 9508973

[51] Int. Cl.$^6$ ................................................ G01S 13/72
[52] U.S. Cl. ........................... 342/95; 342/96; 342/97; 342/107; 342/140
[58] Field of Search .............................. 342/56, 90, 95, 342/96, 97, 107, 113, 139, 140

[56] References Cited

U.S. PATENT DOCUMENTS

| | | | |
|---|---|---|---|
| 3,680,094 | 7/1972 | Bayle et al. | 342/65 |
| 3,727,218 | 4/1973 | Cantwell, Jr. et al. | 342/90 |
| 3,971,020 | 7/1976 | Lavar | 342/129 |
| 3,982,713 | 9/1976 | Martin | 244/3.1 |
| 4,119,971 | 10/1978 | Stark | 343/768 |
| 4,184,154 | 1/1980 | Albanese et al. | 342/107 |
| 4,227,077 | 10/1980 | Hopson et al. | 244/3.16 X |
| 4,277,039 | 7/1981 | Blanning et al. | 244/3.16 |
| 4,347,513 | 8/1982 | Schindler | 342/13 |
| 4,456,912 | 6/1984 | Ensley | 342/13 |
| 4,573,050 | 2/1986 | Waters | 342/157 |
| 4,925,129 | 5/1990 | Salkeld et al. | 244/3.11 |
| 5,053,622 | 10/1991 | Kessler | 89/1.11 X |
| 5,056,740 | 10/1991 | Roth et al. | 244/158 R |
| 5,066,956 | 11/1991 | Martin | 342/154 |
| 5,198,607 | 3/1993 | Livingston et al. | 89/1.11 |
| 5,243,349 | 9/1993 | Mims | 342/25 |
| 5,311,183 | 5/1994 | Mathews et al. | 342/26 |
| 5,340,056 | 8/1994 | Guelman et al. | 244/3.16 |
| 5,424,744 | 6/1995 | Westphal | 342/27 |
| 5,506,582 | 4/1996 | Lawsine | 342/15 |

FOREIGN PATENT DOCUMENTS

| | | |
|---|---|---|
| 0 351 934 | 1/1990 | European Pat. Off. . |
| 0 509 843 | 10/1992 | European Pat. Off. . |
| 0 644 396 | 3/1995 | European Pat. Off. . |
| 1368717 | 10/1974 | United Kingdom . |

*Primary Examiner*—John B. Sotomayor
*Attorney, Agent, or Firm*—Nixon & Vanderhye P.C.

[57] ABSTRACT

The volume of space, in range, azimuth and elevation, over which a conventional Tactical Ballistic Missile (TBM) early warning radar is required to search for incoming missiles is very large. This placed very heavy demands on the radar designer, resulting in large, very high power, low mobility radars, with subsequent vulnerability to ARMs and other defence suppression systems. This invention proposes an alternative approach to a TBM early earning radar which considerably reduces both the design and vulnerability problem, and permits effective TBM early warning radars to be constructed using current technology. This is achieved by moving the radar (1) beyond the front edge of the defended area (2). The increased elevation scan requirements are more than compensated for by a range-adaptive scanning technique which reduces the volume search time by more than 50% compared with a more conventional arrangement.

16 Claims, 7 Drawing Sheets

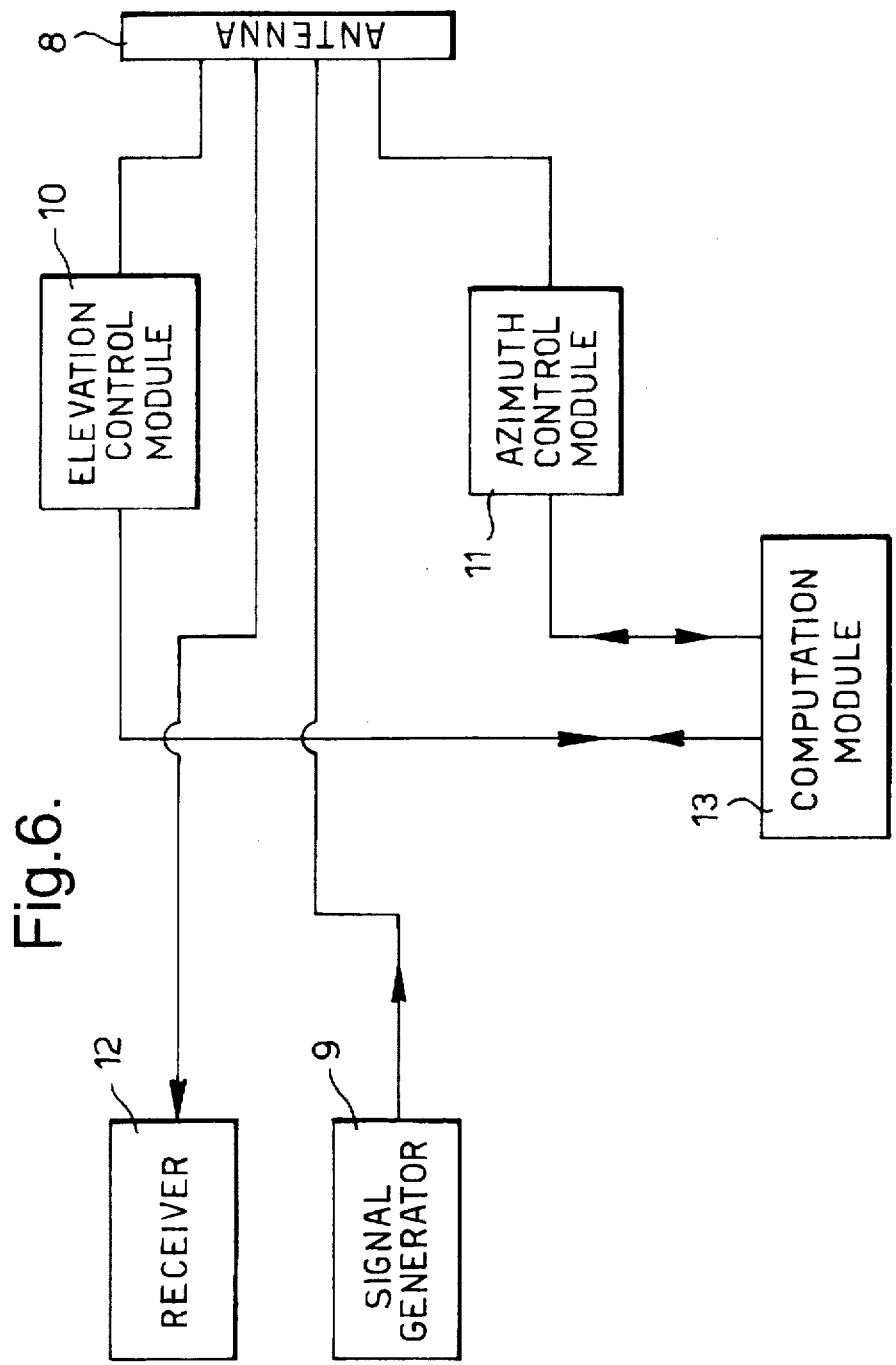

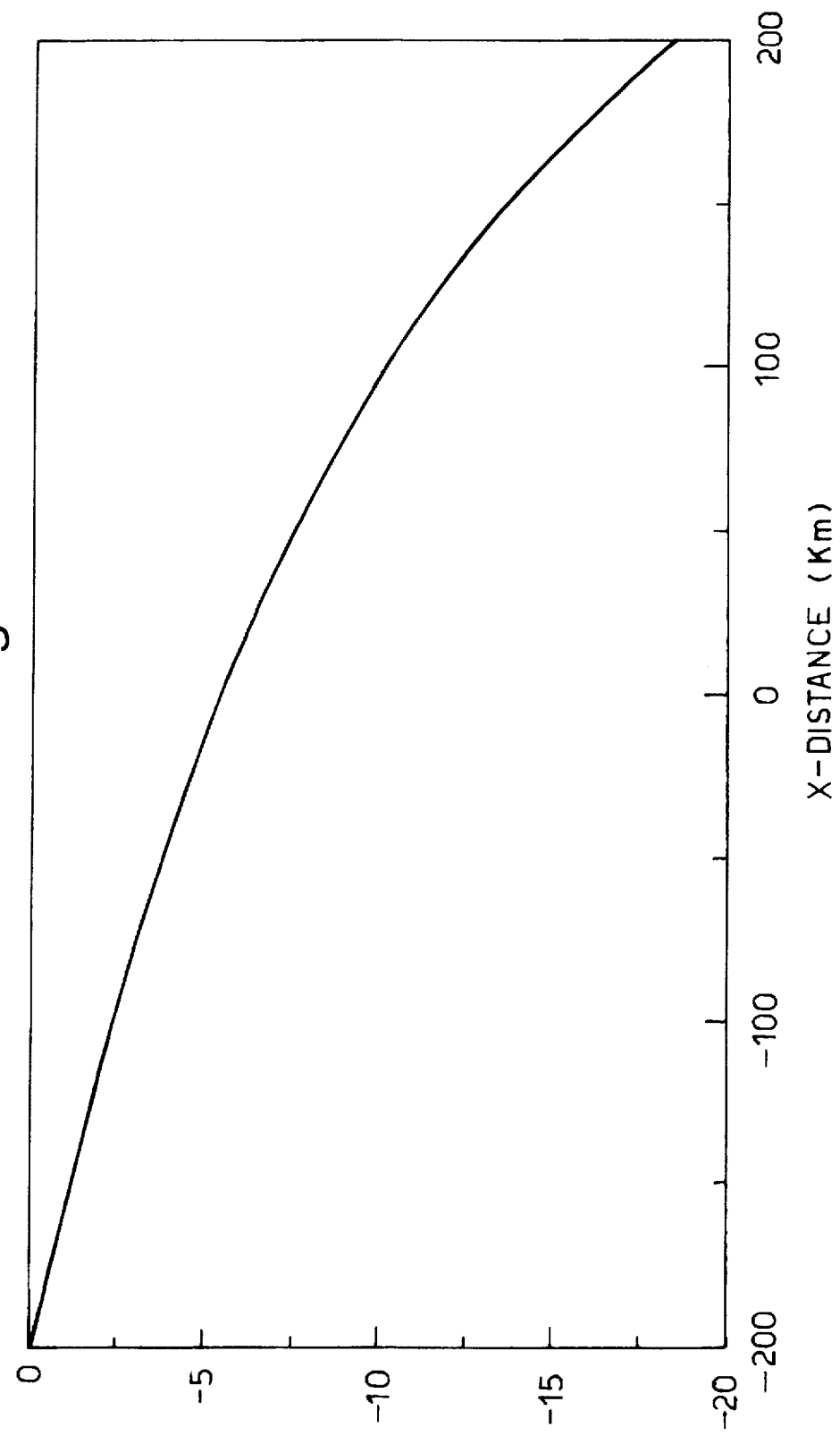

TACTICAL BALLISTIC MISSILE EARLY WARNING RADAR AND DEFENCE SYSTEM

BACKGROUND OF THE INVENTION

1. Field of the Invention

This invention relates to radar systems suitable for early warning of attack from ballistic missiles and to their incorporation within an anti tactical ballistic missile defence system (ATBM).

2. Discussion of Prior Art

The volume of space, in range, azimuth and elevation, over which a Tactical Ballistic Missile (TBM) early warning radar is required to search for incoming missiles is very large. This places very heavy demands on the radar designer, resulting in large, very high power, low mobility radars, with subsequent vulnerability to anti radar missiles and other defence suppression systems. This invention proposes an alternative approach to a TBM early warning radar which considerably reduces both the design and vulnerability problem.

In a ground-based TBM early warning system where the radar is located to the rear of a defended area, at the ranges at which detection is required, lofted trajectory missiles can be at elevation angles of up to 80 degs; depressed trajectory missiles can be at elevation angles as low as 10 degs. In order to keep scan rates high enough to cover the search area in a reasonable time, the radar must have an extremely high Equivalent Radiated Power (ERP) to achieve an adequate detection range.

For shorter range missiles, the wide elevation angle problem can be reduced by using an horizon scan (or "fence") to detect the missiles as they come over the horizon. However, unless extremely powerful radars are used, longer range missiles ascend beyond the range of the beam, and are undetected until they drop into the top of the beam, usually much too late to be engaged. Moreover, this attempt to detect the missiles at low elevation angle and long range extends the required azimuth search angle, greatly reducing the advantage gained from the small elevation search angle.

To increase the altitude coverage, a search radar may be moved further back from the defended area, away from the threat direction. However, it is clear that the range between the radar and the defended area represents an additional range performance demand on the radar ERP. For radars with a limited elevation scan capability, this is usually the only way to provide some degree of TBM detection capability.

As greater and greater ERP and/or dwell time is sought to counter longer and longer range TBMs, which have more and more flexibility in trajectory shaping, significant additional penalties are incurred:

a) The radars become larger and larger, and hence more and more cumbersome and immobile.

b) The large radars become easier targets to find and hit by conventional aircraft attack or visual stand-off weapons.

c) The large ERP requirements make the radars vulnerable to long range anti-radar missiles.

d) The radars are vulnerable to conventional electronic counter measures (ECM) aircraft at low elevation angles, particularly if using an horizon fence search.

For the threat TBMs of current interest (2000 Km maximum range), re-entry velocities up to 4 Km/Sec may be seen for lofted trajectories. However, for depressed trajectories, atmospheric drag limits the degree of practicable depression. It is unlikely, therefore, that 3 Km/Sec will be exceeded for a depressed trajectory. At comparatively high missile target elevation angles, missile time-in-beam is sufficient not to require scanning in this plane. For lower elevation angles however, this is not the case.

SUMMARY OF THE INVENTION

A solution to this problem of limited performance at low target elevation is provided by scanning the beam in elevation as well in azimuth.

However, because the slant range of a target missile is much shorter at low elevation angles compared with high elevation angles, the received power will be greater for low elevation targets; therefore it is possible to increase the scanning rate of the beam (at low elevations) without suffering any degradation in target detection probability. This proposal has the advantage of reducing the overall search time of an early warning radar.

Therefore, according to this invention, a radar system includes means for generating a radar beam and means for scanning the beam at a variable rate wherein the rate of scanning is varied as a function of beam elevation angle, or of azimuth angle, or of both elevation and azimuth angles. In this way for a given pulse repetition frequency and transmitted power, the target detection range of a radar transceiver can be tailored to suit operational requirements.

Such a radar system may, advantageously, be incorporated within an anti-ballistic missile defence system and located between a defended area and the ballistic missile threat direction. In a preferred embodiment, the beam is scanned in both azimuth and elevation and the scanning rate is varied as a function of target detection range.

In one embodiment, the scanning rate is varied as a function of the inverse of the fourth power of target detection range.

Thus, the detection range of the radar maps out a target penetration plane in space, said detection range being much shorter at low elevation than at high elevation angles.

The target penetration plane is located at a sufficient distance from an associated weapons launching system so that on detection of a threat by the radar, there is sufficient time for the launching system to execute a successful interception.

The invention permits a horizontally orientated antenna arrangement (i.e. flat) to be employed which is less vulnerable to conventional air attack than the usual vertical arrangement. This low profile arrangement is also easier to reinforce e.g. put in a bunker. It also lends itself readily to installation on mobile land, sea or air platforms. In addition, the fact that the beam can be angled away from rather than pointing towards the threat direction also greatly reduces its vulnerability to ECM.

BRIEF DESCRIPTION OF THE DRAWINGS

Some examples of the invention will now be described by way of example only, with reference to the drawings, of which;

FIG. 6 is a schematic block diagram showing the constituent parts of the second embodiment; and FIG. 7 is a graph illustrating performance of the second embodiment.

DETAILED DISCUSSION OF PREFERRED EMBODIMENTS

Figure 1:
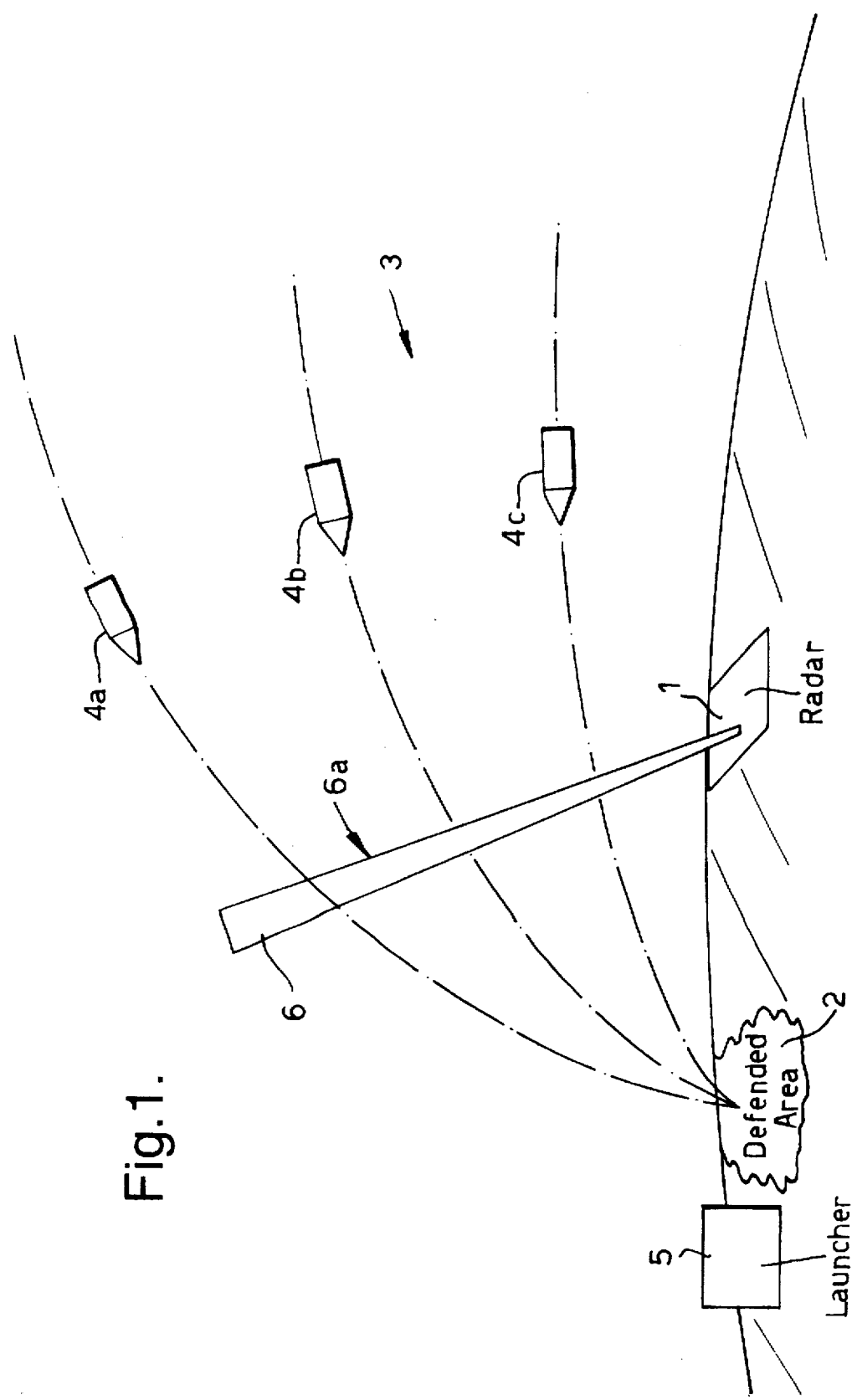
FIG. 1 is a schematic representation of a first embodiment.

In FIG. 1 a radar transceiver 1 is located on the ground between a defended area 2 and a threat direction 3. The threat is represented in the figure by three ballistic missiles 4a, 4b, 4c each on different trajectories. A weapons launch system 5 is located adjacent to the defended area 2.

A conical beam 6 of radiation is transmitted from the radar 1. It is set at a high elevation and canted towards the defended area and has sufficient range so that all possible missile trajectories will pass through it. The beam is scanned in azimuth at a variable rate. The separation between the radar beam 6 and the weapons launch system 5 (and defended area 2) is dictated by the interception range capability of the anti-ballistic weapons launched therefrom.

The extremity 6a of the beam 6 defines a target penetration plane as it is scanned.

Figure 2:
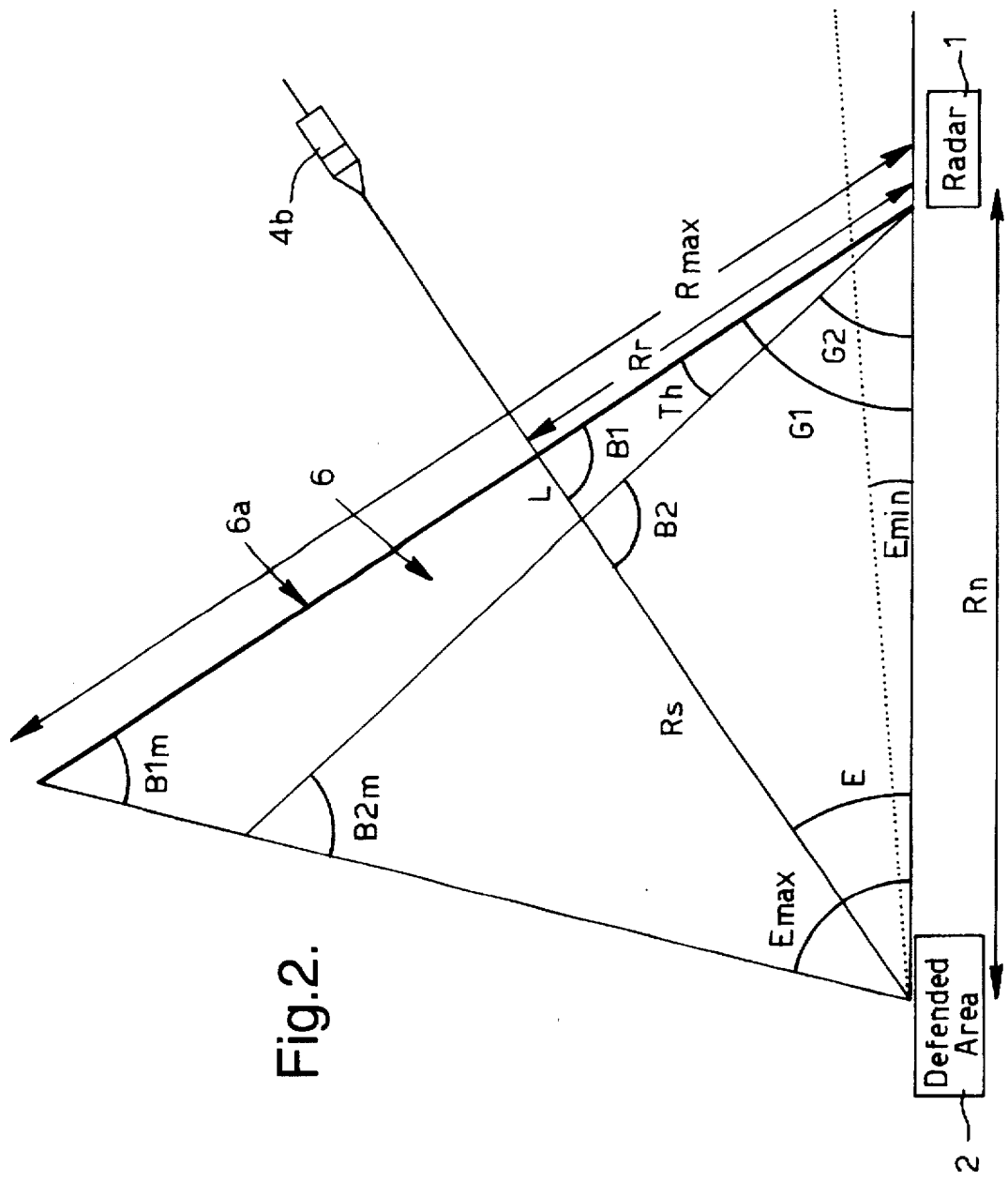
FIG. 2 is a diagram illustrating the geometry of the first embodiment.

The basic (flat earth) geometry for the example of FIG. 1 is shown in FIG. 2. Here, the radar transceiver 1 and defended area 2 are separated by a distance $R_n$. The range capability of the radar at a given azimuth angle is assumed to be 500 Km.=$R_{max}$.

We can determine 'L' the distance travelled in the beam 6 by a missile 4b at slant range $R_r$ from the radar 1 as follows:

Determine G1 and G2 from the Emax case, where Emax is the maximum missile elevation; 80 degs.

$\sin(B1_m) = R_n \cdot \sin(Emax)/Rmax$ $G1 = 180 - Emax - B1_m$ $G2 = G1 - Th$ (where Th is the beam width)

Figure 3:
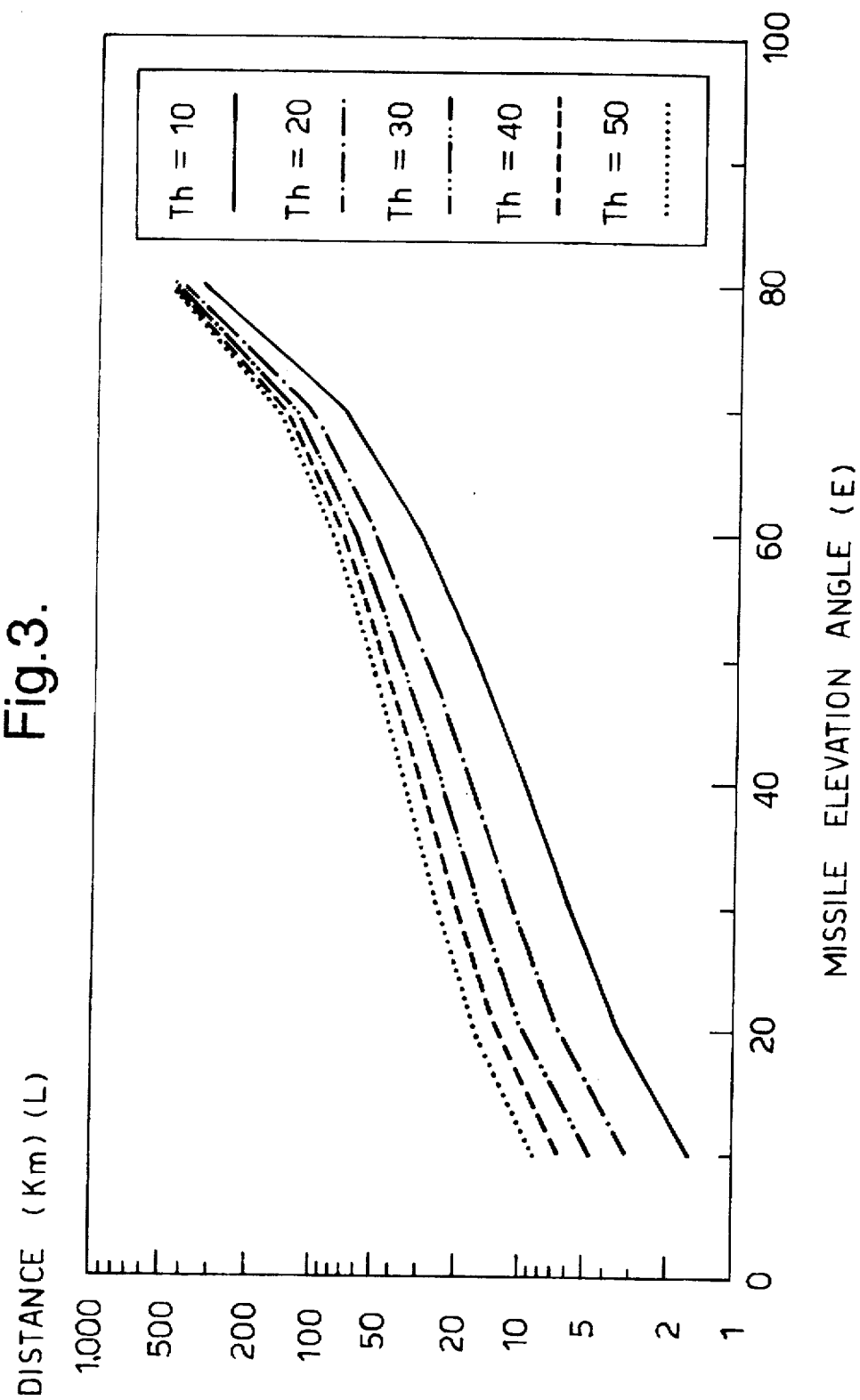
FIG. 3 is a graph illustrating certain performance characteristics of the first embodiment.

For the general case at slant range $R_r$ from the radar at elevation angle E:

$B1 = 180 - E - G1$ $B2 = B1 + Th$ $(R_r + L) = R_n \cdot \sin(G1)/\sin(B1)$ $R_r = R_n \cdot \sin(G2)/\sin(B2)$ Giving $L = R_n(\sin(G1)/\sin(B1) - \sin(G2)/\sin(B2))$ FIG. 3 shows the results for L versus E for $R_n = 50$ Km and for radar vertical beam widths of Th=10 degs to 50 degs respectively. It may be noted that L is not particularly sensitive to either $R_n$ or Th.

As can be seen from FIG. 3, by comparing values of L for high and low elevation targets, the distance travelled (or time spent) in the beam by missiles with depressed trajectories is likely to be low enough to place a serious limitation on the detection probability of the radar in such cases.

Figure 4:
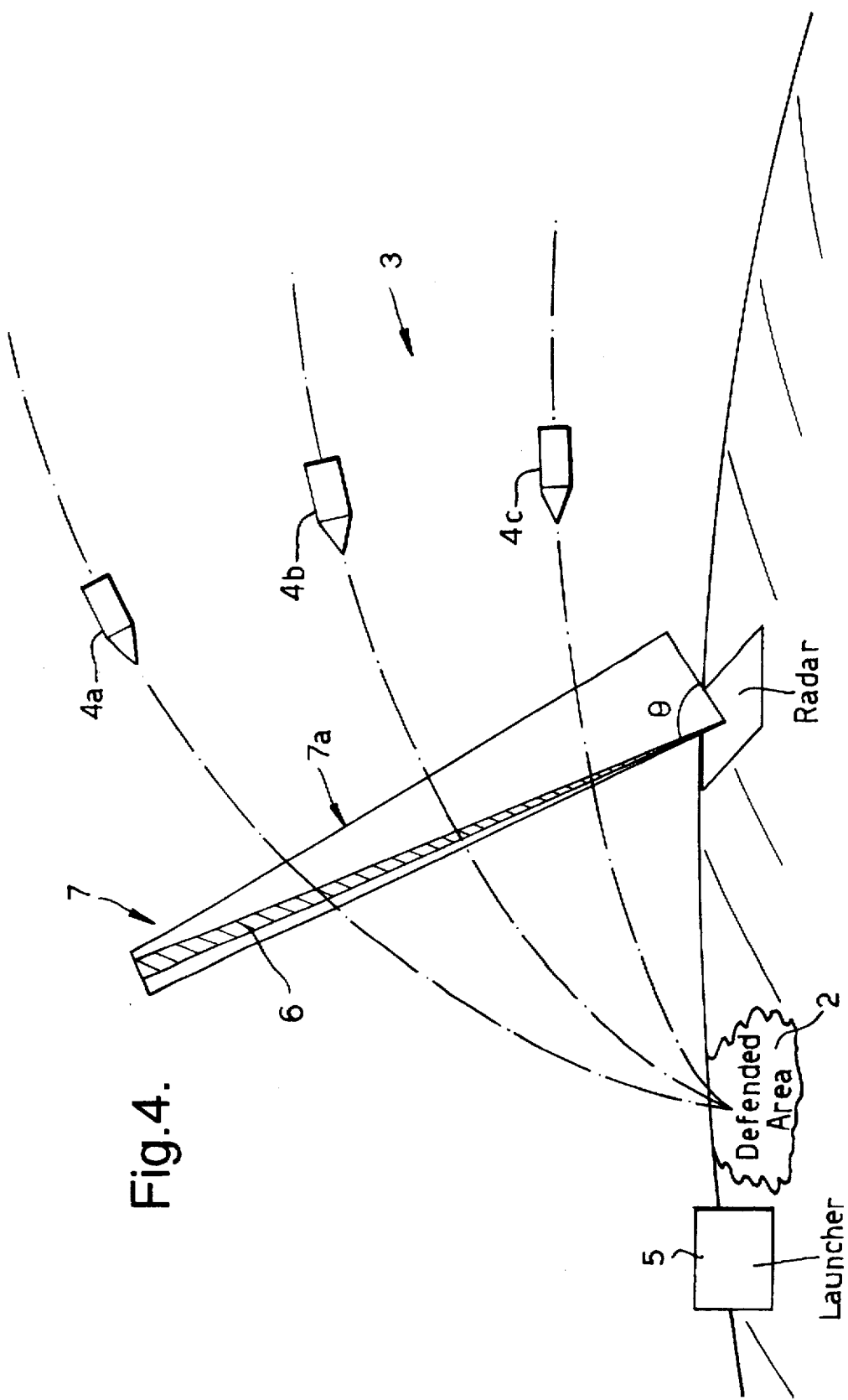
FIG. 4 is a schematic representation of a second embodiment of the invention.

To overcome this problem the beam is scanned in elevation as in the embodiment of FIG. 4.

In FIG. 4 and in common with the embodiment of FIG. 1, a horizontally oriented radar 1 is positioned between the defended area 2 and the threat direction 3. The area 2 is defended by the weapons launch system 5 located adjacent thereto and the threat is again represented by three TBMs 4a, 4b and 4c having differing trajectories.

In contrast with the first embodiment, the radar beam 6 of FIG. 4 is scanned in azimuth and in elevation and at a variable rate.

The total elevation angle of scan is shown as θ.

In FIG. 4 the target detection range of the transceiver 1 is represented by the contour 7, with a portion 7a thereof denoting the target penetration plane. The contour 7 encloses the effective search volume of the radar 1.

For an given range performance the radar of FIG. 4 requires on average less Equivalent Radiated Power (ERP) than a conventional radar. Because tactical ballistic missiles travel at such extreme velocities, however, the time from initial detection to impact with the target is very much shorter than for air breathing threats. The time it takes for the early warning radar to search for incoming TBM is therefore critical. As a measure of performance therefore, we will use the time to scan the search volume given constant radar ERP.

We will maintain the quotient P/S=C, as a constant where:

P=received power

S=scan rate i.e. if the target missile is closer, we can scan quicker. This means we will have a constant probability of detection versus range.

Now P is inversely proportional to $R^4$, where $R^4$=the fourth power of range i.e. radar-to-missile distance i.e. $P = K/R^4$ K=constant i.e. $K/(S \cdot R^4) = C$ i.e. $S = K/(C \cdot R^4)$ Time T to search angular area = angular area/s      (1)

$\qquad = (B_v \times B_H \times C \times R^4)/K$

Where $B_v$=Vertical elevation search angle $B_H$=Horizontal azimuth search angle Thus, search time for any radar relative to a reference radar may be obtained without knowing C and K.

It will thus be appreciated that the scan rate for the beam 6 of FIG. 4 is not constant but varies in proportion to the inverse of the fourth power of the range to the target penetration plane.

Figure 5:
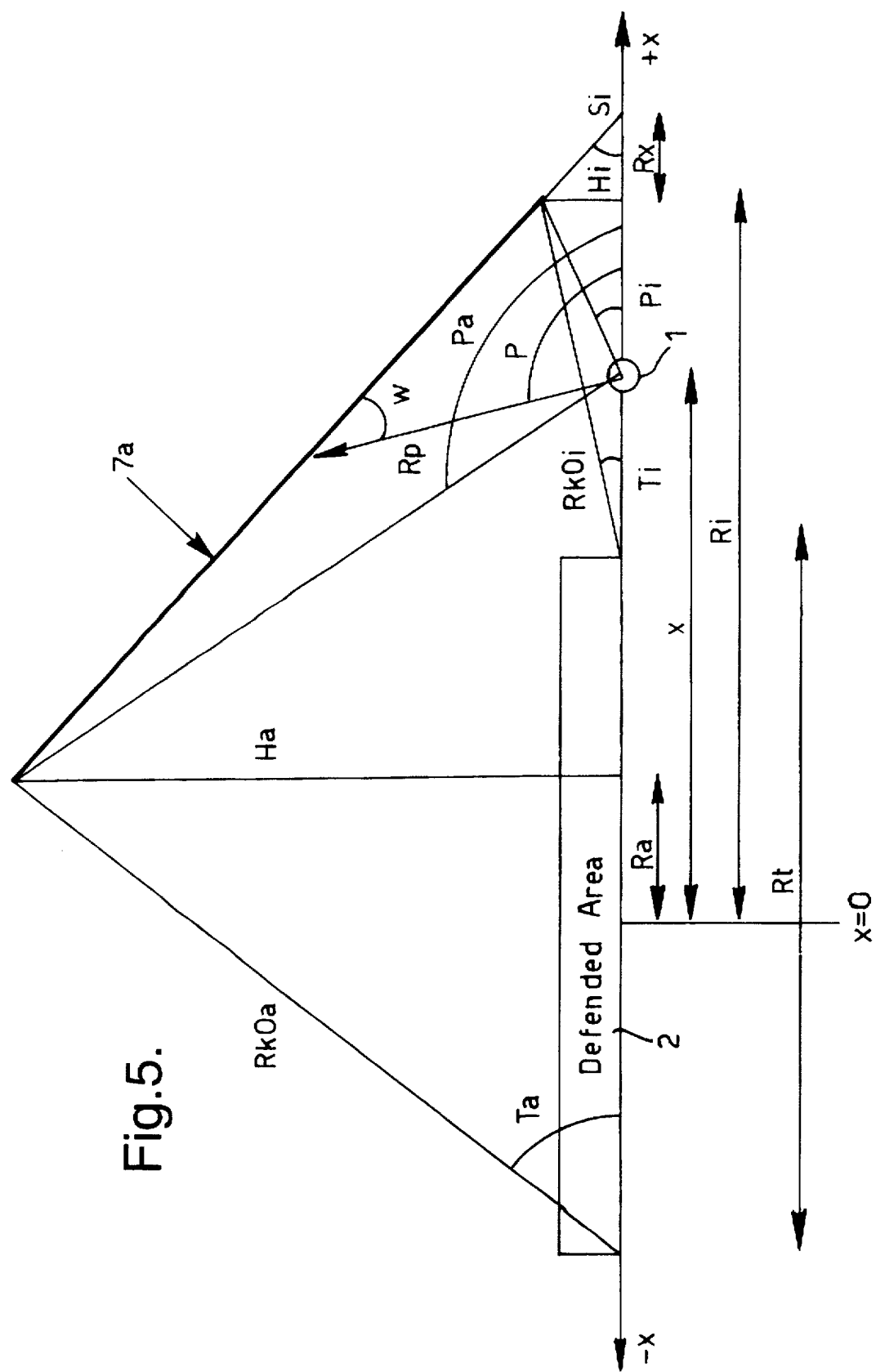
FIG. 5 is a diagram illustrating the geometry of the second embodiment.

The geometry of the radar of FIG. 4 is shown in FIG. 5.

FIG. 5 shows the general elevation plane geometry (at the centre of the azimuth scan) for comparison of a conventional radar (x is negative) with the radar of FIG. 4 (x is positive). The range $R_p$ to any point on the target penetration plane 7a may be calculated as follows:

$Ha = RkOa \cdot \sin(Ta)$
$Hi = RkOi \cdot \sin(Ti)$
$Ra = RkOa \cdot \cos(Ta) - Rt/2$
$Ri = RkOi \cdot \cos(Ti) + Rt/2$
$Pa = \arctan(Ha/(x - Ra))$
$Pi = \arctan(Hi/(Ri - x))$
$RX = Hi \cdot (Ri - Ra)/(Ha - Hi)$
$Si = \arctan(Hi/Rx)$
$w = 180 - P - Si$
$R_p = \sin(Si) \cdot (Ri - x + Rx)/\sin(w)$ Where x is the distance between the radar 1 and the closest point of the defended area 2

Taking into account azimuth angle as well, $R_p = \sin(Si) \cdot (Ri - x + Rx)/(\sin(w) \cos(a))$      (2)

where 'a' is the azimuth angle relative to the centre of the scan.

Thus, the range to all points on the penetration plane (i.e. including into the azimuth plane) may be calculated; a linear approximation to a mean range R may then be obtained and used to calculate a total scan time and measure of performance as shown below.

The operation of the anti-ballistic missile defence system of FIG. 4, and in particular that of the radar 1 will now be described with reference to FIG. 6.

The radar includes a two dimensional phased array antenna 8 for scanning a beam in elevation and azimuth.

A pulsed radar signal is supplied to the antenna 8 by a signal generator 9, and beam steering control signals are supplied to the antenna 8 from an elevation scan control module 10 and an azimuth scan control module 11. Conventional receiving circuitry 12 processes radar return signals received via the antenna 8.

The optimum location of the radar with respect to the defended area and the beam scanning angles, transmitted power and pulse repetition frequency are all determined having regard to the nature of the perceived threat and the capabilities of the weapons launch system. Further geometric parameters of the system relating to target penetration plane location and attitude with respect to the radar are determined and stored in a computation module 13.

In operation, the elevation and azimuth scan control modules 10 and 11 scan the beam between pre-chosen limits so that the required search volume is covered. Instantaneous values of elevation and azimuth angle are relayed by the modules 10 and 11 to the computation module 13 which calculates the value of $R_p$, the range to the target penetration plane from the equation (2). The computation module 13 then scales scanning rate parameters in accordance with the inverse of the fourth power of the calculated value for $R_p$. The elevation and azimuth scan control modules 10 and 11 then modify the scanning rate accordingly.

On detection of a target missile by the radar transceiver, the weapons launch system is alerted. A tracking radar (not shown) may be deployed to assist any defensive weapons launched in successfully intercepting the incoming TBM.

An example of the threat TBM and defending ATBM system is defined below.

Threat TBM Definition

Threat Azimuth 120 degs.

Max range 2000 Km

Min range 300 Km

Max Velocities:

Elevation angle =80 degs velocity=4 Km/s 45 degs velocity=3 Km/s 10 degs velocity=1.5 Km/s ATBM System Definition Missile maximum range 100 Km Missile maximum altitude 30 Km Tracking radar maximum range 200 Km The system reaction time from initial TBM detection to ATBM missile away is assumed to be 30 secs.

Required Detection Range

The maximum required detection range (from the ATBM missile launcher) is a function of the ATBM missile performance.

Max missile intercept slant range S at Elevation E (S(E)) at 30 Km altitude:

S(80)=30.1 Km

S(45)=42.5 Km

S(10)=172 Km

S(10) exceeds the ABTM max range i.e. S(10)=100 Km

Corresponding fly-out times F(E) for the ATBM:

F(80)=12 secs

F(45)=17 secs

F(10)=40 secs

Total time from initial detection to intercept T(E):

T(80)=42 secs

T(45)=47 secs

T(10)=70 secs

Distance R(E) travelled by TBM in these times:

R(80)=168 Km

R(45)=141 Km

R(10)=105 Km

Max detection range D(E)=R(E)+S(E):

D(80)=198 Km

D(45)=184 Km

D(10)=205 Km

Although the total elevation scan angle θ is somewhat greater for the radar of FIG. 4 than for most conventional search radars (which are positioned beyond the target area, away from the threat direction) this is more than compensated for by the range-adaptive scanning provision.

Using equations (1) and (2) above, the variation in scan time relative to an arbitrary reference radar can be computed.

FIG. 7 shows the variation in dB in search time as x varies (see FIG. 5) from x=−200 Km to x=+200 Km. The difference between any two cases gives the actual change in search time between them in dB e.g. a radar at +50 Km (i.e. at the front edge of the target area) is about 3.5 dB better than a conventional radar at −50 Km (i.e. at the rear edge of the target area). Thus, it would search the required volume in less than half the time. By placing the radar 50 Km in front of the target area, the search time would be reduced to 20% of the −50 Km value.

A further advantage is that all likely TBM tracks are covered whereas in the case of the conventional radar, earth curvature conceals short range depressed trajectories.

I claim:

1. A radar system comprising:

means for generating a beam; and means for scanning said beam in elevation at a variable rate in which said rate is varied as a function of beam elevation angle.

2. An anti-ballistic missile defence system including a radar, in accordance with claim 1, located between a defended area and a ballistic missile threat direction.

3. A radar system comprising:

means for generating a beam; and means for scanning said beam in azimuth at a variable rate in which said rate is varied as a function of beam azimuth angle.

4. An anti-ballistic missile defence system including a radar, in accordance with claim 3, located between a defended area and a ballistic missile threat direction.

5. A radar system comprising:

means for generating a beam; and means for scanning said beam in both elevation and azimuth at a variable rate in which said rate is varied as a function of beam azimuth angle and elevation angle.

6. A anti-ballistic missile defence system including a radar, in accordance with claim 5, located between a defended area and a ballistic missile threat direction in which said radar includes mean for computing a target detection range and means for varying said rate according to the magnitude of said range.

7. An anti-ballistic missile defence system according to claim 6 in which said rate is varied in proportion to the reciprocal of the fourth power of said target detection range.

8. A method for controlling a target detection range of a scanning radar including the step of varying the scanning rate of a beam transmitted by said radar during a complete scan.

9. A method in accordance with claim 8, wherein said scanning rate is varied as a function of one of beam azimuth angle and beam elevation angle.

10. A method in accordance with claim 9, wherein said scanning rate is varied as a function of beam azimuth angle.

11. A method in accordance with claim 9, wherein said scanning rate is varied as a function of beam elevation angle.

12. A method in accordance with claim 9, wherein said scanning rate is varied as a function of both said beam azimuth angle and said beam elevation angle.

13. A radar system including:
   an antenna for scanning a radar beam at a variable scan rate, $d\theta/dt$, where $\theta$ is a scan angle;
   a signal generator for supplying a radar signal to said antenna; and
   a beam scanning controller, connected to said antenna, for computing an instantaneous value of scan angle $\theta$ and for varying said variable scan rate $d\theta/dt$, of the radar beam according to the instantaneous value of the scan angle $\theta$.

14. An anti-ballistic missile defence system including a radar system, in accordance with claim 13, located between a defended area and a ballistic missile threat direction.

15. An anti-ballistic missile defence system including a radar system located between a defended area and a ballistic missile threat direction in which said radar system includes:
   an antenna for scanning a radar beam at a variable scan rate,
   a signal generator for supplying a radar signal to said antenna, and
   a beam scanning controller for computing a target detection range and for varying said variable scan rate of the radar beam according to the value of the target detection range.

16. An anti-ballistic missile defence system according to claim 15 in which said variable scan rate is varied in proportion to the reciprocal of the fourth power of said target detection range.

* * * * *